Figures 1, 2:
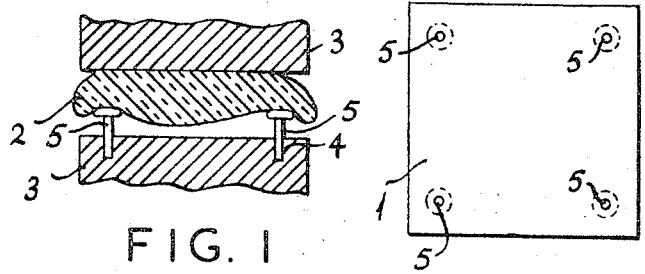

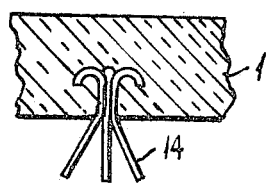
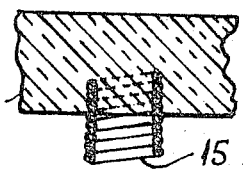
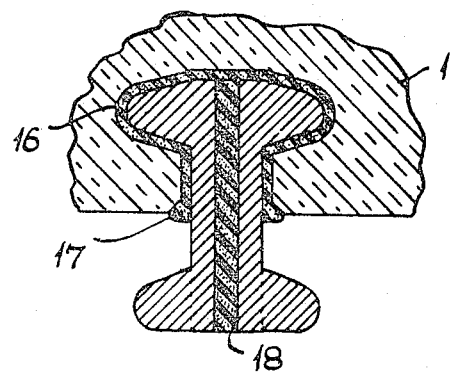
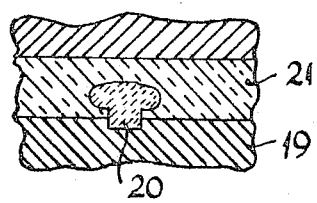
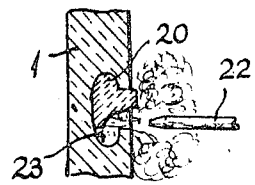
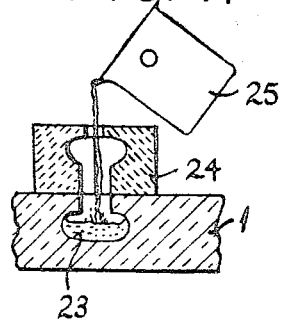
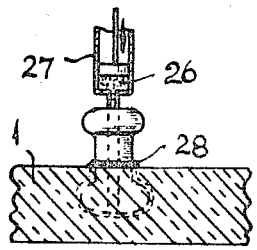

United States Patent Office 3,309,123
Patented Mar. 14, 1967

3,309,123
ATTACHMENT OF INSERTS AND FIXING DEVICES TO PIECES OF VITREOUS SILICA, GLASS AND SUCH MATERIAL
Frederick J. Edwards, Jesmond, Newcastle-upon-Tyne, England, assignor to The Thermal Syndicate Limited, Wallsend, England, a British company
Filed May 21, 1963, Ser. No. 282,013
6 Claims. (Cl. 287—189.365)

This invention relates to blocks, slabs, plates, tiles and similar pieces of vitreous silica or silica glass. For convenience, the term "silica glass" has been used in this specification, but this should be understood to include substantially pure fused silica as well as silica glass.

In particular, but not exclusively, this invention relates to decorative or protective cladding plates for architectural, or industrial applications and also to wall, ceiling or floor blocks for the lining of furnaces or similar chambers. The silica glass blocks, slabs, plates, tiles or the like (hereinafter for convenience referred to simply as "blocks") require to be attached to a supporting structure in the form of a brick, concrete, stone or metal wall or framework, and some form of fastening device is required for this purpose. Heretofore when blocks of silica glass have required to be mounted on a supporting structure fixing devices have been secured to the block subsequent to the construction of the block and commonly the attachment of fixing devices has been performed just prior to the block being used.

The present invention relates to an improved method of mounting a fastening device in a block of silica glass and comprises moulding the silica glass in a plastic state around a former to define a cavity in the block into which the fastening device is, or may subsequently be, located.

The two main methods of the invention are firstly to employ a removable former for defining the cavity in the plastic block of silica glass and then subsequently to cast the fastening device in situ in the cavity formed upon removal of the former and secondly to employ the fastening device as the former so that a cavity is formed in the silica glass and the device is located in the cavity in a single unified operation.

Where a removable former is employed, it is preferred to make it of a combustible material (e.g. graphite) so that after the silica glass has been moulded around the former the latter may be burnt away to leave the cavity.

In view of the difference between the temperature at which the cavity is moulded, or the insert cast in a cavity, and the ambient temperature, unless the fixing device is formed of a material having substantially the same coefficient of thermal expansion as the silica glass in which it is cast, differential shrinkage will occur between the glass and the device as the device cools. In general shrinkage does occur and has the effect of leaving the device loose in the cavity. It is then convenient to inject a hardenable resilient sealing compound into the gap formed between the device and the block. This sealing compound has the effect of securing the device in position and also of preventing the ingress of moisture into the gap.

A further feature of the invention relates to a block or cladding plate of silica glass made by the method hereinbefore described.

The invention will now be more fully described, by way of example, with reference to the accompanying drawings, in which:

FIGURE 1 is a schematic view of a silica glass block in course of production by the method according to the invention.

Figures 3, 4:
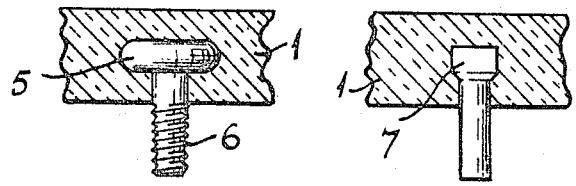

FIGURE 2 is a plan from below of the block illustrated in FIGURE 1 when completed, FIGURE 3 is an enlarged cross-sectional view of one of the fixing devices of the block of FIGURE 2, FIGURES 4 to 10 are views similar to FIGURE 3 but showing alternative forms of fixing device, FIGURE 11 is a view in cross-section of a further modified form of the fixing device of FIGURE 3, and FIGURES 12 to 15 show schematically steps in the production of a cladding plate in accordance with the invention.

Referring to FIGURES 1 and 2, a silica glass block 1 is formed by pressing a molten blob of silica glass 2 between relatively movable opposed platens 3. The lower platen contains recesses 4 in which metallic fixing studs 5 are located. The lower platen is made of cast iron and is suitably cooled (in a manner not shown) so that during the pressing operation the maximum temperature reached by the studs 5 does not exceed the melting point of the metal from which they are formed. The upper platen is forced down on to the plastic mass of molten silica glass 2 and causes it to "flow" around the studs 5 so that the studs become embedded in the silica glass as it is formed into a block 1.

From FIGURE 2 it can be seen that the block 1 contains four studs 5 one fixed close to each corner of the block and all the studs projecting from the same side of the block.

FIGURE 3 shows on an enlarged scale one stud 5 located in the block 1 and it can be seen that the projecting shank 6 of the stud 5 is screw-threaded to facilitate the securing of the block 1 to a supporting structure (not shown).

FIGURE 4 shows a modified form of stud in which the head 7 of the stud is of rectangular shape as opposed to the disc-shaped head of the stud 5 of FIGURE 3, and in which the shank of the stud is plain rather than being screw-threaded as in the case of the shank 6 of the stud of FIGURE 3.

Figures 5, 6:
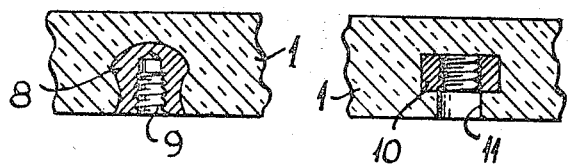

FIGURE 5 shows a reentrant tubular insert 8 which is non-rotatably secured in the block and is provided with a tapped hole 9 into which a fixing screw (not shown) can be engaged.

FIGURE 6 shows a nut 10 moulded into the block at the end of a blind hole 11. The hole 11 is a clearance hole for a screw (not shown) corresponding to the thread size of the nut 10.

Figures 7, 8:
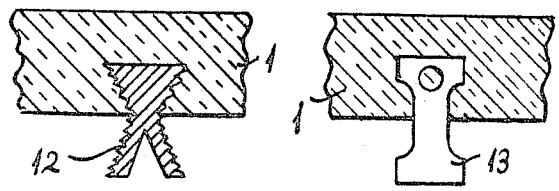

FIGURE 7 shows a fixing device in the form of a rag bolt, the projecting threaded shank 12 of which may be flattened or may be of circular cross-section.

FIGURE 8 shows a simple fixing device in the form of a bendable metal tag 13. FIGURE 9 shows a wire fixing device in the form of a tri-furcated clip 14 and FIGURE 10 shows a fixing device in the form of a helical wire insert 15.

FIGURE 11 shows a further type of fixing device in which a double-headed stud-shaped metal fixing device is secured in the cavity 16 in the block 1 by means of a layer of an air-settable latex sealing compound 17. The compound 17 has been injected into the cavity 16 through aperture 18 extending through the fixing device. The fixing device of FIGURE 11 was formed by the method illustrated with reference to FIGURES 12 to 15.

FIGURE 12 shows the lower platen 19 of a press with a graphite insert 20 located in a recess in the upper surface thereof and a blob of fused vitreous silica 21 compressed around the insert to create a graphite inclusion within the hot silica mass.

The insert 20 is now burnt away in the manner illustrated schematically in FIGURE 13 in which a jet of oxygen at low pressure is played on the graphite from a lance 22, causing the inset to burn and leave a cavity 23 in the silica.

A two-part graphite mould sleeve 24 is placed against the block of silica in the manner illustrated in FIGURE 14, to define, with the cavity 23, a mould in which the fixing stud can be cast. Molten Phosphor bronze is then poured into the cavity 23 from a ladle 25 to fill the cavity and the mould sleeve 24. As the Phosphor bronze solidifies, the two parts of the mould sleeve 24 can be removed and it is then found that the stud formed within the cavity has shrunk from the walls of the cavity and is loose in the block 1. Were the block to be used in this condition, for exterior work, water could enter the gap formed in the cavity and if this water were subsequently to freeze there would be a possibility of the block cracking. Further, the looseness of the stud in the cavity makes it impossible to secure the block tightly to a structural member.

FIGURE 15 shows schematically the method whereby the stud is sealed into the cavity 23. A quantity of an air-setting latex sealing composition 26 is injected into a hole drilled through the stud from a syringe 27, until the composition entirely fills the void between the stud and the block and forms a small fillet 28 around the outside of the stud. When the sealing composition has hardened the stud is resiliently, but securely, held in the cavity in the block; and the block can be supported readily from any convenient support member by means of the stud.

Fastening devices can be made, where circumstances warrent it, from refractory metals, as well as from materials such as graphite, carbon and other materials which will char on contact with the plastic silica glass to leave a carbonaceous or similar residue. It is envisaged that many other materials may be used for fastening devices provided each material possesses the required properties of being strong enough to withstand the pressure resulting from insertion and has a high enough melting point. For example, hollow fastening devices made of light gauge metal, filled with granular refractory material in powder form, or a low melting point metal such as lead or tin may be used, because after attachment to the silica glass, the filling of the hollow fastening device may be removed.

If a thicker layer of resilient sealing compound is desired around a metallic fastening device than can be obtained merely by thermal shrinkage, the head of the device may be covered with a coating of material which will burn away or which can be removed by other means such as chemical action or abrasion, so leaving greater clearance for any filling which may subsequently be required. It should be noted that the use of a coating of the kind referred to may be an essential part of the process for fixing some types of device into some types of silica glass.

Although the method in accordance with the invention specifically disclosed in the foregoing description involves the moulding of the plastic silica glass between relatively movable platens, it will be appreciated that the silica glass can be moulded around the former by any other suitable method e.g. between a roll and a cooperating plate or between two cooperating rolls.

I claim:
1. A method of mounting a fastening device in a block of silica glass, comprising the steps of:
 (a) mounting an insert of combustible refractory material in a recess on a forming surface of a platen;
 (b) placing a blob of plastic silica glass over said insert;
 (c) pressing the plastic silica glass against the forming surface of the platen to mould the silica glass around the insert;
 (d) allowing the silica glass to harden sufficiently to permit removal of the silica glass and insert embedded therein from the platen;
 (e) directing a stream of oxygen on to the insert while still hot to cause the latter to burn away and leave a cavity in the silica glass;
 (f) pouring molten metal into the cavity in the silica glass;
 (g) allowing the metal to harden in the cavity into a fastening device and
 (h) injecting a resilient sealing composition into any gap formed between the fastening device and the cavity to seal the device in the cavity.

2. A method of mounting a fastening device in a block of silica glass comprising the steps of:
 (a) pressing a blob of plastic silica glass around an insert of destructible refractory material;
 (b) destroying the insert to leave a cavity in the silica glass;
 (c) pouring molten metal into the cavity in the silica glass, and
 (d) allowing the metal to harden into a fastening device.

3. A method of mounting a fastening device in a block of silica glass comprising the steps of:
 (a) mounting a fastening device in a recess on a forming surface;
 (b) placing a blob of plastic silica glass over said fastening device;
 (c) pressing the plastic silica glass against the forming surface to mould the silica glass around the fastening device;
 (d) allowing the silica glass to harden sufficiently to permit removal of the glass and fastening device embedded therein from the forming surface, and
 (e) injecting a resilient sealing composition into any gap formed between the fastening device and the block of silica glass to seal the fastening device into the latter.

4. A method of mounting a fastener in vitreous material, comprising the steps of pressing a quantity of vitreous material in plastic state about an insert member to at least partially embed the same therein; destroying at least a portion of said insert member whereby to obtain in the vitreous material a cavity; and introducing a fastener into said cavity.

5. A method as defined in claim 4, wherein said fastener is constituted by thermoplastic material poured into said cavity and allowed to harden therein.

6. A method as defined in claim 4, wherein said fastener is introduced by pouring into said gap a thermoplastic material having a coefficient of expansion differing from that of said vitreous material whereby differential contraction of the two materials results in formation of a clearance around said thermoplastic material within said cavity; and further comprising the step of introducing a sealing composition into said clearance to seal said fastener in said cavity.

References Cited by the Examiner

UNITED STATES PATENTS

| 42,931 | 5/1864 | Demuth | 64—59 |
|---|---|---|---|
| 1,606,697 | 11/1926 | Dean | 52—296 |
| 2,024,388 | 12/1935 | Rabezzana | 287—189.36 |
| 2,106,578 | 1/1938 | Schwartzwalder et al. | 287—189.36 |
| 2,130,531 | 9/1938 | Arand | 52—714 |
| 2,255,184 | 9/1941 | Osenberg | 287—189.36 |
| 3,019,865 | 2/1962 | Rohe | 52—617 |

FOREIGN PATENTS

| 692,145 | 8/1964 | Canada. |
|---|---|---|
| 1,356,760 | 2/1964 | France. |

REINALDO P. MACHADO, *Primary Examiner.*

HARRISON R. MOSELEY, *Examiner.*

A. I. BREIER, *Assistant Examiner.*